United States Patent [19]
Johnson

[11] Patent Number: 5,594,352
[45] Date of Patent: Jan. 14, 1997

[54] FUEL TANK TRANSDUCER MODULE CIRCUIT

[75] Inventor: Glen A. Johnson, Mesa, Ariz.

[73] Assignee: Arizona Instrument Corporation, Phoenix, Ariz.

[21] Appl. No.: 401,938

[22] Filed: Mar. 10, 1995

[51] Int. Cl.$^6$ .......................... G01R 27/26; G01F 23/00
[52] U.S. Cl. ........................ 324/664; 73/290 V
[58] Field of Search ............................ 324/664; 73/642, 73/629, 597, 290 V; 310/317

[56] References Cited

U.S. PATENT DOCUMENTS

| | | | |
|---|---|---|---|
| 2,963,680 | 12/1960 | Beebe | 310/317 |
| 3,585,405 | 6/1971 | Stettiner | 310/317 |
| 3,985,030 | 10/1976 | Charlton | 73/290 V |
| 4,000,650 | 1/1977 | Snyder | 73/290 V |
| 4,531,406 | 7/1985 | Fritz | 73/290 V |
| 4,692,672 | 9/1987 | Okuno | 310/317 |
| 4,748,846 | 6/1988 | Haynes | 73/290 V |
| 4,785,664 | 11/1988 | Reebs | 73/290 V |
| 4,868,797 | 9/1989 | Soltz | 367/98 |
| 4,901,245 | 2/1990 | Olson et al. | 364/509 |
| 4,909,080 | 3/1990 | Kikuta et al. | 73/290 V |

*Primary Examiner*—Louis M. Arana
*Attorney, Agent, or Firm*—O'Connor, Cavanagh; Donald J. Lenkszus

[57] ABSTRACT

A circuit for use with an ultrasonic transducer utilized to measure depths of liquids in tanks is described.

11 Claims, 3 Drawing Sheets

FUEL TANK TRANSDUCER MODULE CIRCUIT

BACKGROUND OF THE INVENTION

This invention pertains to the measurement of the volume of liquid in a fuel tank, and in particular to the measurement of volume of liquid in an underground fuel tank using ultrasound.

Fuel such as gasoline is typically stored in underground storage tanks where the volume of fuel cannot be visually or directly determined. In the past, one commonly used method to measure the volume of fuel in the tanks was by use of a calibrated measuring rod which was manually inserted into a tank standpipe which was also used to fill the tank. In recent years improvements have been made to the art of measuring the volume of liquid which have eliminated the use of manual methods. These improvements have produced apparatus which is highly accurate in the measuring of liquid volume. In many instances, these improvements have been necessitated by governmental regulations which mandate that leaks from underground storage tanks be detected.

The cost of cleaning up environmental leaks is high. It is much more economic to detect leaks early so that necessary repairs and environmental cleanup can be done at the lowest possible cost.

Various systems have been developed which utilize a probe which is suspended or supported in the underground fuel tank. The probe is connected to a control console which is physically remote from the probe. The type of probe utilized is dependent on the type of measuring technique utilized. In one type of system, an ultrasonic transducer is suspended at the bottom end of a long probe.

The ultrasonic transducer is operated by periodically applying a pulse to the transducer. The transducer is excited by the pulse to produce an ultrasonic signal which propagates generally vertically in the tank. Ultrasonic echoes produced by the surface of the liquid and/or reflectors are indicative of the liquid depth in the tank. The echo delay time can therefore be utilized to calculate the volume of the liquid in the tank.

One problem arises in the use of ultrasonic probes which are physically located at great distances from the control console. For example, in some applications, it may be required to run up to a 500 foot cable between the transducer and the drive electronics located at the control console. Long cable runs severely attenuate the drive signals. Also, the return echo signals also become severely attenuated with long cable runs.

In one prior arrangement, a transformer is positioned near the transducer to provide for impedance matching to the transducer. However this arrangement is not entirely satisfactory.

It is therefore desirable to provide a means for operating ultrasonic transducers of the type utilized in ultrasonic probes used to measure the volume of fuel in an underground tank from a control console located up to a long distances from the probes.

SUMMARY OF THE INVENTION

In accordance with the principles of the invention, a circuit is provided which will enable the control console to be physically located at long distances, e.g., up to 500 feet or more, from an ultrasonic transducer which is included in a fuel measuring system. A circuit in accordance with the invention allows the use of shielded cable having two signal conductors and a ground conductor to be used for both transmitting and receiving.

A circuit in accordance with the invention includes a charge storage circuit to generate a sufficiently large signal to excite the transducer. A constant relatively low voltage is applied to the transmit wire in the cable. At times when the transducer is to be excited, a pulse is applied to the transmit line. The circuit responds by generating a significantly higher voltage pulse output to the transducer. The circuit operates such that during the times when a constant voltage is applied, a capacitor is allowed to charge to a steady state condition. When the pulse is applied, the voltage across the capacitor jumps, the capacitor transfers stored energy to an inductor. The inductor in turn transfers energy to the transducer and a ringing voltage of large magnitude is produced by the inductor and the transducer. The ringing voltage causes the transducer to emit ultrasonic signals.

Further in accordance with the principles of the invention, the circuit includes temperature sensing apparatus which may be remotely interrogated over the same cable utilized to operator the transducer.

BRIEF DESCRIPTION OF THE DRAWING

The invention may be better understood from a reading of the following detailed description of the illustrative embodiment of the invention taken in conjunction with the drawing in which like reference designations are used to designate like elements in the different figures and in which.

DETAILED DESCRIPTION

A system for the measuring or gauging of fuel in underground storage tanks to which the invention may be advantageously applied is utilized at a gasoline service station of conventional design having an underground fuel storage tank. The service station building includes a control console. The console is connected a fuel measuring probe which is supported in the underground tank. The connection is via a twisted conductor cable which includes two wires and a ground wire. The cable is run underground between the building and the tank. The tank includes standpipe which is disposed in a containment box. The standpipe has supported therein an ultrasonic probe which may be of a known design.

One system to which the present invention may be advantageously applied is described in my copending application titled Liquid Measuring System and Method which was filed on even date herewith and which is assigned to a common assignee. The description contained in my copending application is incorporated herein by reference.

At the bottom end of the probe is a transducer assembly which includes an ultrasonic transducer which may, for example, be of a piezoelectric variety. A transducer circuit which is the subject of the present invention may be located immediately adjacent the transducer at the bottom of the probe or it may be located in the aforementioned containment box.

Figure 1:
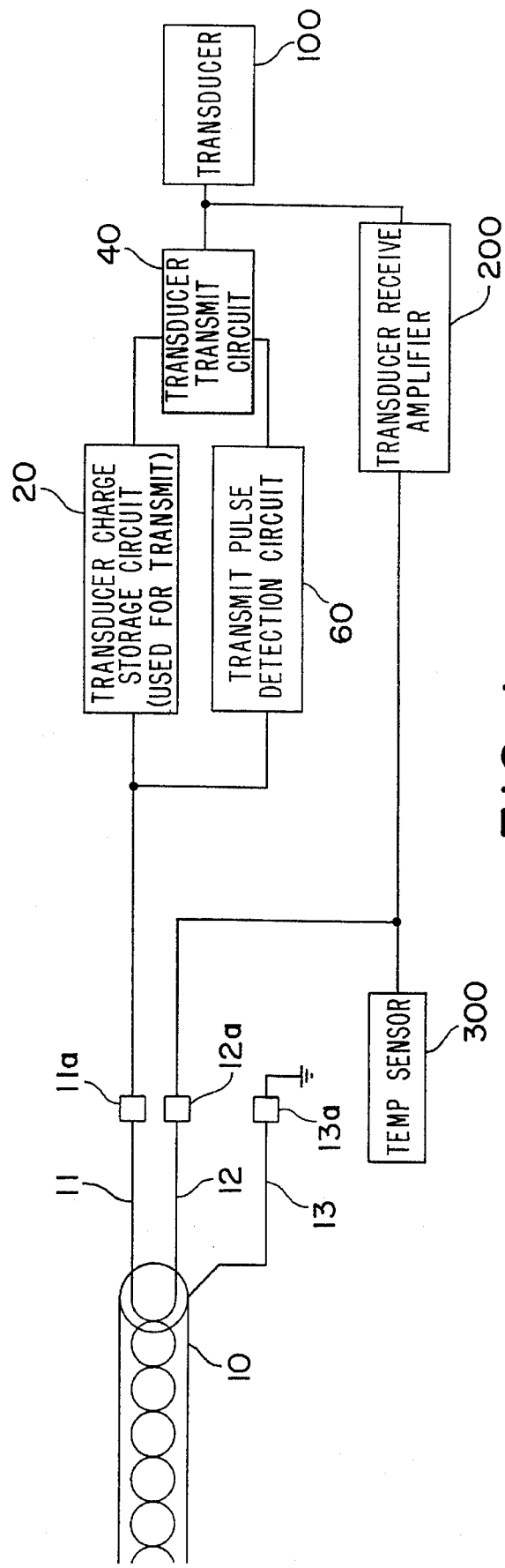
FIG. 1 illustrates the circuit of the present invention in block diagram form.
Figure 2:
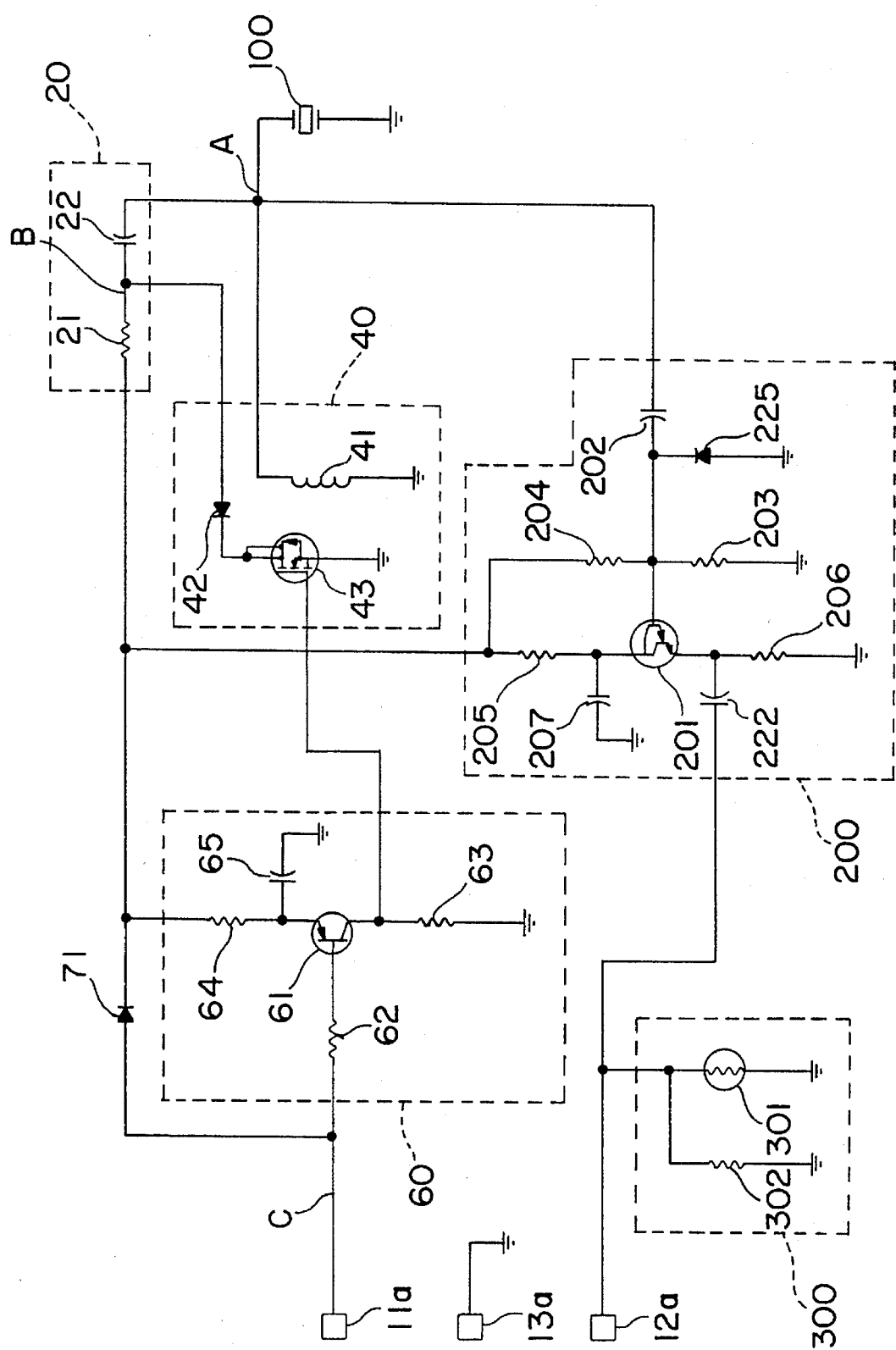
FIG. 2 illustrates the circuit of FIG. 1 in greater detail.

Turning now to FIGS. 1 and 2, a circuit in accordance with the invention is shown in schematic form. The circuit may be described in terms of the various functional blocks which outline components of the circuit drawing. The circuit comprises a transducer charge storage block 20, a transducer transmit block 40 and a transmit pulse detection block 60 to provide pulses to the transducer 100. The circuit also includes a transducer receive amplifier 200 to provide return echo signals and a temperature sensor 300.

The cable 10 is a commercially available twisted conductor shielded cable of the type having two signal conductors and a ground conductor. One of the conductors 11 is designated for transmitting signals to the transducer 100. The other signal conductor 12 is used to transmit echo signals back to the control console. The ground conductor 13 is used as a common wire for both transmit and receive. Cable 10 has conductor 11 connected to terminal 11a of the circuit, conductor 12 connected to terminal 12a, and ground conductor 13 connected to terminal 13a.

The transmit line 11 is via terminal 11a connected to a diode 71. Diode 71 provides power for the circuits from the voltage applied to line 11. In normal operation, a steady state voltage of approximately 10 to 20 volts is applied to the transmit line 11. Also connected to line 11 via terminal 11a is transmit pulse detector 60. The transmit pulse detector 60 includes a transistor 61 having its base coupled to terminal 11a via resistor 62. The collector of transistor 61 is connected to ground via resistor 63 and its emitter is coupled to the d.c. output of diode 71 through resistor 64. A capacitor 65 connects the emitter of transistor 61 to ground. The output of the transmit pulse detector 60 is taken at the collector of transistor 61. The output from transistor 61 is coupled to the transducer transmit block 40.

The transducer transmit block 40 includes MOSFET transistor 43, diode 42, and inductor 41. The transducer transmit block 40 is coupled to the transducer charge storage block 20.

Transducer charge storage block 20 includes resistor 21 coupled to diode 71 and capacitor 22. The transducer 100 is connected to the junction of capacitor 22 and inductor 41.

Figure 3:
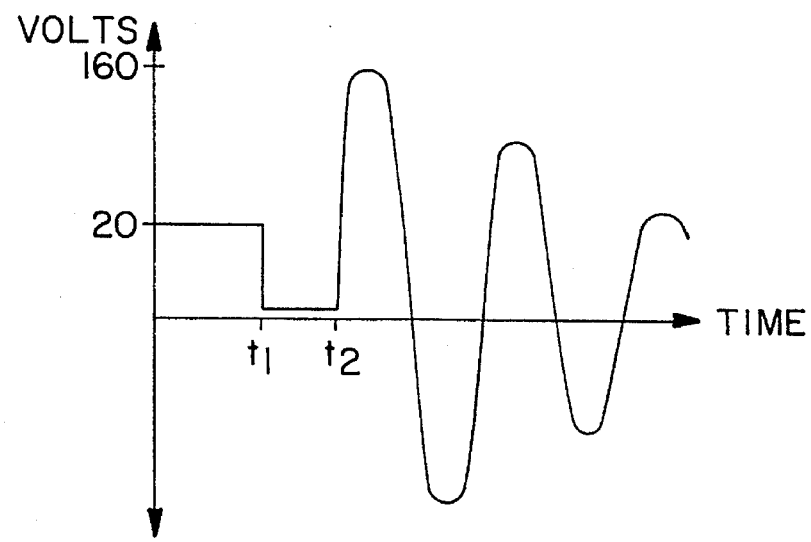
FIG. 3 is a signal waveform of the voltage at point B of the circuit in FIG. 2.
Figure 4:
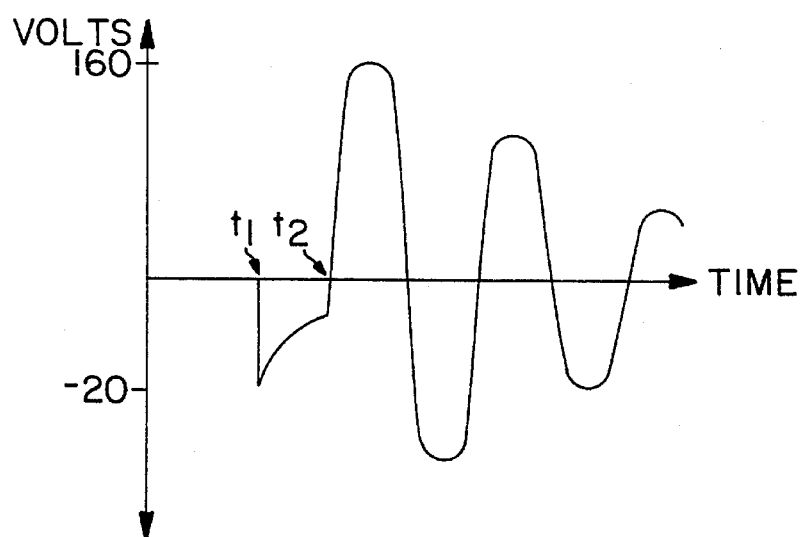
FIG. 4 is a signal waveform of the voltage at point A of the circuit in FIG. 2.
Figure 5:
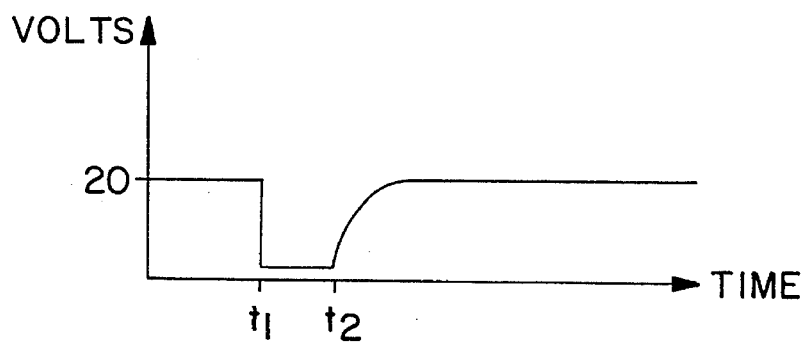
FIG. 5 is a signal waveform of the voltage at point C of the circuit in FIG. 2.

In operation, transmit line 11 and therefore terminal 11a is normally at a quiescent state of 10 to 20 volts as shown in FIG. 5. With transmit line 11 at a steady state voltage, capacitor 22 charges up through the diode 71 to the voltage at terminal 11a minus the forward bias voltage drop across diode 71. Under steady state conditions, capacitor 22 will be fully charged and no current will flow through inductor 41. The voltage at point A, as shown in FIG. 4, will, under steady state conditions, be zero volts because under steady state DC conditions, no current flows through capacitor 22 and inductor 41 acts as a short to ground. The voltage at point B, as shown in FIG. 3 will be the steady state voltage at terminal 11a minus the voltage drop across diode 71.

Periodically, at a time t1 a pulse is applied to the transmit line 11. The pulse, shown in FIG. 3, is received at terminal 11a and is a negative going pulse which drives the voltage on line 11 to near zero volts for approximately 2 microseconds. The transmit pulse detector 60 responds to the signal on line 11 to provide a trigger pulse to MOSFET transistor 43. The pulse will turn transistor 43 on causing the diode 42 to be forward biased. When diode 42 becomes forward biased, the voltage at Point B, which had previously been under steady state DC conditions at the positive DC voltage on line 11 minus the voltage drop through the diode 71 now suddenly is driven to near zero volts at time t1 as shown in the waveform of FIG. 3. With Point B jumping in voltage from a positive DC potential to approximately zero volts, a negative voltage is produced at Point A as shown in the waveform of FIG. 4. At this time, t1, the capacitor 22 instantaneously applies a voltage across inductor 41 which results in an increasing current in the inductor 41. At time t2, when the pulse at line 11 is over, the transistor 61 turns off and transistor 43 turns off. When transistor 43 turns off, a positive going voltage spike is immediately produced across inductor 41. Inductor 41 and the transducer 100 produce a ringing waveform of up to 160 volts. In effect, the energy stored in the capacitor 22 during quiescent conditions is transferred to the inductor 41 and in turn, the inductor energy is transferred to the transducer 100. The excited transducer 100 responds to the ringing waveform by emitting ultrasonic signals.

The echo signals produced by reflectors or liquid surfaces or discontinuities are used to measure the depth of liquid in the underground tank, and from that the volume of liquid is determined. The transducer 100 responds to the receipt of ultrasonic echo signals by producing an electrical output signal at point A in FIG. 2.

Connected to the transducer 100 is transducer receive amplifier 200. The amplifier 200 includes an AC coupling capacitor 202 connecting the transducer 100 to the base of darlington pair transistor 201. Transistor 201 is connected as an amplifier circuit with its resistors 203, 204, 205, and 206. Transistor 201 is connected in an emitter follower current amplifier configuration. The capacitor 222 provides for the AC coupling from the amplifier 200 to the receive line 12 via terminal 12a. Diode 225 prevents transistor 201 from becoming reverse biased. With this amplifier arrangement, the echo signals provided by the transducer 100 are amplified and easily transmitted over the 500' cable line 12.

Transducer 100 is a conventional, commercially available piezoelectric ultrasonic transducer.

The temperature sensor circuit 300 includes a commercially available thermistor 301 and a resistor 302. The resistor 302 is provided to linearize the response of the thermistor. In operation, if it is desired to determine what the temperature is, a DC current is applied to the line 12 with line 11 unpowered. The capacitor 202 electrically isolates the temperature sensor 300 from the rest of the circuit. The DC current applied to line 12 flows through the thermistor 301 and the parallel resistance 302. By measuring the voltage at the current source which may be 500 feet away, it is possible to determine what the resistance of the thermistor 301 is and therefore, to determine what the temperature is in the fuel tank.

Although my invention has been described in terms of the specific illustrative embodiment, it will be apparent to those skilled in the art that various changes and modifications may be made to the embodiment without departing from the spirit and the scope of the invention. I intend to be limited not by any of the description set forth herein, but only by the claims as appended hereto.

What is claimed is:

1. A circuit for use in a system for measuring liquid stored in a tank, comprising:

first and second terminals coupleable to a cable, said first terminal being at a first voltage level relative to said second terminal and receiving voltage pulses;

a first capacitor having one end coupled to said first terminal;

an inductor coupled in series between the other terminal of said first capacitor and said second terminal;

an ultrasonic transducer coupled in parallel to said inductor;

an electronic switch having a control input coupled to said first terminal and having a switched path coupled in parallel with said first capacitor and said inductor, said switched path being switchable between first and second conductive states, said switch being operable such that said each of said voltage pulses received at said first terminal causes said switch to switch from said first conductive state to said second conductive state, said switch remaining in said second conductive state for a predetermined period of time after which said switch switches back to said first conductive state;

said circuit being operable such that when said switch is in said first conductive state said capacitor stores energy, and operable such that when said switch is in said second state said energy stored in said capacitor is transferred from said capacitor to said inductor, and operable such that after said switch switches from said second state back to said first state said inductor transfers said energy to said transducer.

2. A circuit in accordance with claim 1, comprising:

said circuit operating such that when energy is transferred to said transducer, a signal having a peak voltage greater in magnitude than said first voltage level is produced across said transducer.

3. A circuit in accordance with claim 2, wherein:

said signal is in the shape of a ringing signal waveform.

4. A circuit in accordance with claim 1, wherein:

said electronic switch comprises at least one transistor.

5. A circuit in accordance with claim 4, wherein:

said electronic switch comprises a bipolar transistor switch having its base coupled to said first terminal; and a MOSFET transistor having its gate coupled to one of the collector or emitter of said bipolar transistor and having its source and drain terminals connected in said switched path.

6. A circuit in accordance with claim 1, comprising:

a third terminal coupleable to said cable;

an amplifier having an output coupled to said third terminal and having an input coupled to said transducer, said amplifier operating to couple output signals produced by said transducer to said cable.

7. A circuit in accordance with claim 6, wherein:

said amplifier is a current amplifier.

8. A circuit in accordance with claim 6, comprising:

a second capacitor connected between said amplifier input and said transducer.

9. A circuit in accordance with claim 6, wherein:

said amplifier receives power from said first terminal.

10. A circuit in accordance with claim 6 comprising:

a temperature sensor coupled between said second and third terminals; and a third capacitor coupled between said amplifier and said third terminal.

11. A circuit in accordance with claim 10, wherein:

said circuit operates such that when a dc voltage signal is applied to said second terminal, current flow through said temperature sensor indicates the temperature of said sensor.

\* \* \* \* \*